United States Patent

Matsui et al.

[11] Patent Number: 5,926,595
[45] Date of Patent: Jul. 20, 1999

[54] OPTICAL FIBER CONNECTOR PART AND PROCESS FOR PRODUCING THE SAME

[75] Inventors: Koji Matsui; Kuniyoshi Ueda, both of Yamaguchi; Toshihiko Arakawa, Toyama; Michiharu Ogawa, Yamaguchi, all of Japan

[73] Assignee: Tosoh Corporation, Shinnanyo, Japan

[21] Appl. No.: 08/974,650

[22] Filed: Nov. 19, 1997

[30] Foreign Application Priority Data

Nov. 20, 1996 [JP] Japan ................................ 8-309156
Dec. 27, 1996 [JP] Japan ................................ 8-349588

[51] Int. Cl.⁶ ................................................ G02B 6/36
[52] U.S. Cl. .................................... 385/78; 385/60; 385/72
[58] Field of Search .................................. 385/78, 81, 85, 385/60, 62, 72, 75; 501/103, 105

[56] References Cited

U.S. PATENT DOCUMENTS 5,337,390  8/1994  Henson et al. .......................... 385/81
5,631,986  5/1997  Fery et al. .............................. 385/78

*Primary Examiner*—Hemang Sanghavi
*Attorney, Agent, or Firm*—Oblon, Spivak, McClelland, Maier & Neustadt, P.C.

[57] ABSTRACT

A novel optical fiber connector part is provided which comprises a ferrule having a capillary hole for holding an optical fiber, the ferrule being formed from a zirconia-alumina composite oxide containing yttria at a content ranging from 2 to 4 mol % in zirconia. In the optical fiber connector part, a sleeve for connecting and holding the ferrule may be formed from zirconia and/or a zirconia-alumina composite oxide. A process for producing the optical fiber connector part is provided wherein the granular zirconia-alumina composed of a particulate zirconia-alumina mixture having an average particle diameter of not more than 1 $\mu$m is used as raw material. The granular zirconia-alumina preferably contains alumina at a content ranging from 0.1% to 50% by weight. The process comprises spray-drying a slurry containing a particulate zirconia-alumina mixture having an average particle diameter of not more than 1 $\mu$m. The ferrule has a stable spherical face at the tip, and will not deform during long-term connection. The granular zirconia-alumina has excellent sintering characteristics.

6 Claims, 2 Drawing Sheets

OPTICAL FIBER CONNECTOR PART AND PROCESS FOR PRODUCING THE SAME

BACKGROUND OF THE INVENTION

1. Field of the Invention

The present invention relates to a connection part for optical fibers for optical communication, particularly to an optical fiber connector part comprising a ferrule having excellent shape stability. The present invention relates also to granular zirconia-alumina having excellent sintering characteristics.

2. Description of the Related Art

The connector employed for optical fiber connection in the optical fiber communication system is constituted of plugs 2 and an adapter 1 as shown in FIG. 1. The plug 2 holds a ferrule of a precise cylinder outside diameter having a finely machined capillary hole 31 in the center. An optical fiber is inserted into the hole and is integrated with the ferrule. The tip of the ferrule is worked to have a spherical convex face. A pair of the plugs are forced into the adapter 1 from the both sides of the adapter for fiber connection. If the axes of the optical fibers deviate from each other, optical loss occurs to cause signal transmission loss. Therefore the ferrule part used should have a precisely controlled shape in the outside diameter, the inside diameter, the length, and so forth. The adapter 1 has a sleeve 4 as shown in FIG. 3 to hold and align the two ferrules 3 elastically. Conventionally, a sintered zirconia compact partially stabilized by yttria is used as the material for forming the ferrule and the sleeve part. This sintered zirconia compact, which has a small crystal particle size, high strength, and high toughness, can be worked precisely at the surface and is less liable to develop defects such as chipping, being suitable for the material for ferrules, sleeves, and the like parts. However, the ferrule formed from the sintered zirconia compact is liable to be deformed at the spherical tip face during long-term press connection, giving failure in re-connection of the fiber disadvantageously. Therefore, ferrule or sleeve parts are demanded which are stable dimensionally to retain the spherical shape of the tip face on connection-disconnection of the connector.

An optical fiber connector is known in which a pair of inner rings having an optical fiber fitted in the capillary hole thereof are inserted into a sleeve from both ends of the sleeve to bring the tips of the inner rings into contact, the inner rings and the sleeve being formed from zirconia ceramics (JP-A-5-333239).

The above optical fiber connector part is obtained by molding a powdery zirconia material containing a stabilizer such as $Y_2O_3$, MgO, and CaO into a prescribed shape and then sintering the molded article at a temperature ranging from 1400° C. to 1600° C. The optical fiber connector part made from this sintered zirconia compact can be deformed at the spherical face of the ferrule tip by the press contact as mentioned above, thereby resulting in contact failure at re-connection after disconnection, and is not suitable for the optical fiber connector part.

The inventors of the present invention noticed the crystalline particle diameter and the chemical constitution of the sintered compacts of zirconia-alumina composite oxide, and studied comprehensively the workability of the surface of the optical fiber connector part and the shape stability of the spherical tip face of the ferrule formed from the compact to complete the present invention.

The inventors of the present invention noticed also the average particle diameter and the granule properties of a mixture of particulate zirconia containing a solid-solute stabilizer and particulate alumina for raw material of production of a sintered compact of the above zirconia-alumina composite oxide, and studied comprehensively the sintering characteristics of the particle mixture to complete the present invention.

SUMMARY OF THE INVENTION

The present invention intends further to provide an optical fiber connector part employing high-strength high-toughness zirconia-alumina composite oxide, the connector part having shape stability of the spherical face of the ferrule tip without deformation of the spherical face during long-term connection, and having excellent surface workability without the above drawbacks of the conventional connector part.

The optical fiber connector part of the present invention comprises a ferrule having a capillary hole for holding an optical fiber, the ferrule being produced by molding a zirconia-alumina composite oxide containing yttria at a content ranging from 2 to 4 mol % in zirconia.

The optical fiber connector part of the present invention comprises a sleeve for connecting and holding the above ferrule, the sleeve being produced by molding zirconia and/or a zirconia-alumina composite oxide.

The process for producing the optical fiber connector part comprises using granular zirconia-alumina composed of a particulate zirconia-alumina mixture having an average particle diameter of not more than 1 µm.

The granular zirconia-alumina in the present invention contains alumina at a content ranging from 0.1% to 50% by weight.

The process for producing the particulate zirconia-alumina mixture comprises spray-drying a slurry containing a particulate zirconia-alumina mixture having an average particle diameter of not more than 1 µm.

DETAILED DESCRIPTION OF THE PREFERRED EMBODIMENT

Figure 1:
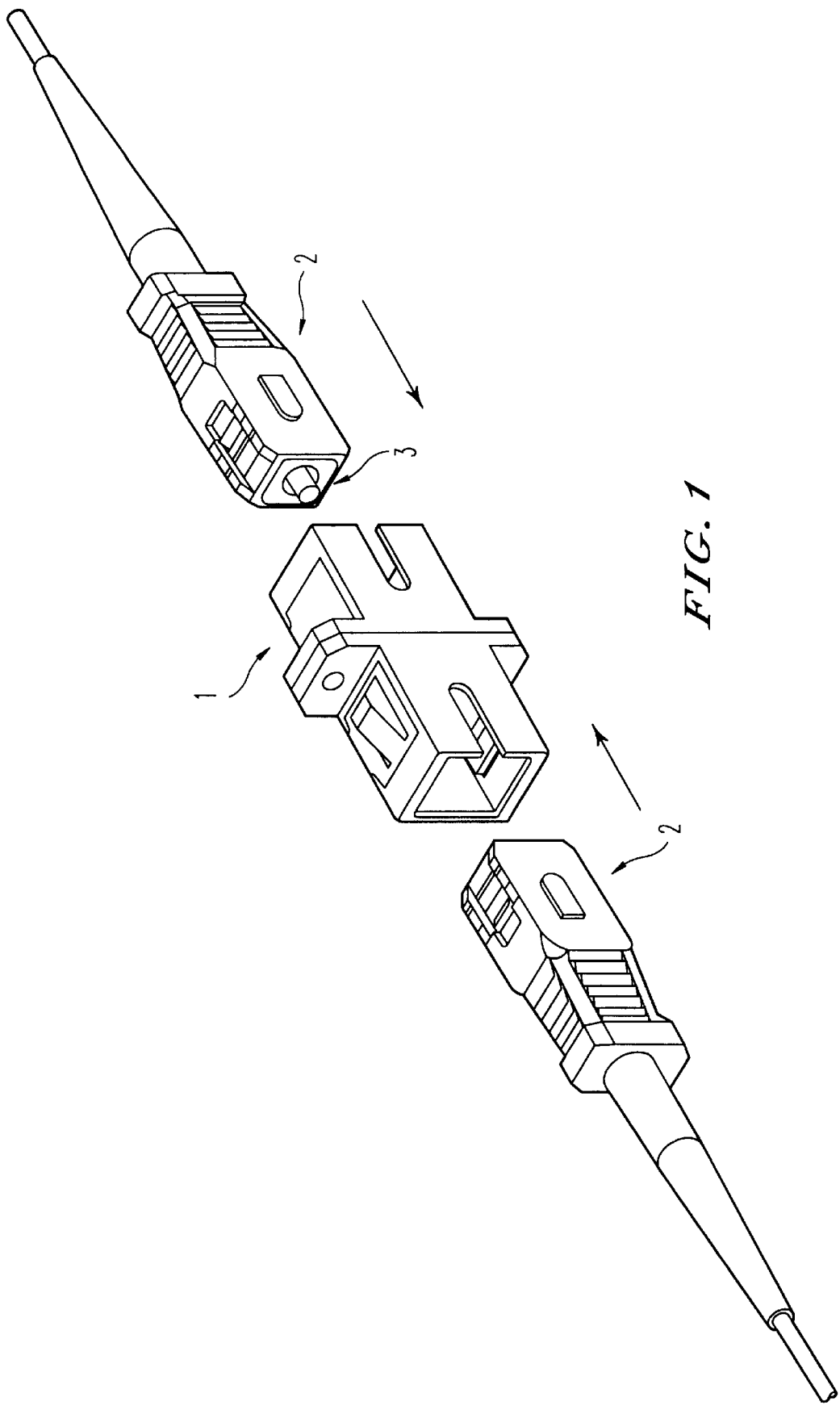
FIG. 1 shows a connector employed for optical fiber communication.
Figure 2:
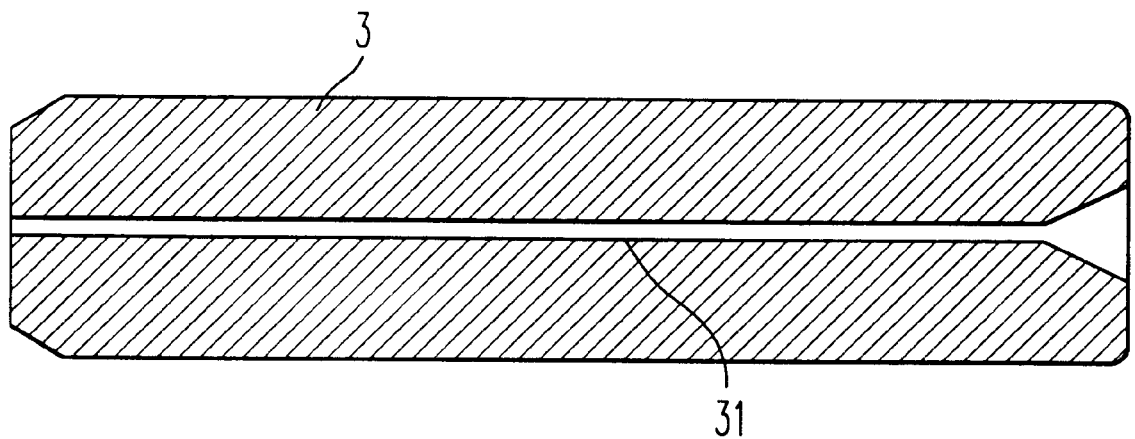
FIG. 2 shows a sectional view of a ferrule.
Figure 3:
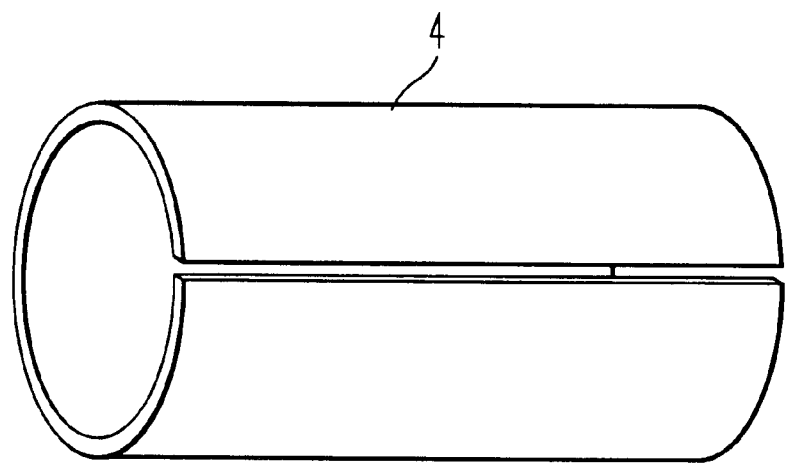
FIG. 3 shows a structure of a sleeve.

In the present invention, the term "yttria content" of the zirconia-alumina composite oxide means the ratio in mole percent of $Y_2O_3/(ZrO_2+Y_2O_3)$. The term "alumina content" means the ratio in percent by weight of $Al_2O_3/(ZrO_2+Y_2O_3+Al_2O_3)$. The term "granule" means a particulate matter formed by granulating a mixture of particulate zirconia and particulate alumina. The term "average granule diameter" means the diameter of a sphere having the same volume as the median (granule diameter at 50% of the cumulative distribution) of the particle size distribution on the weight basis, measured by a sieving test. The "average particle diameter" of the zirconia particles and the alumina particles means the diameter of a sphere having the same volume as the median (particle diameter at 50% of the cumulative distribution) of the particle size distribution on the volume basis, measured with a particle size distribution analyser according to a laser diffraction method, a centrifugal sedimentation method, or a like method. The "BET specific surface area" is measured by use of nitrogen as the adsorption molecules.

The term "shape stability of spherical face" of the optical fiber connector part means no deformation caused substantially by press connection of the ferrule tip as observed with high-resolution microscopy, differential interference polarization microscopy, or a like method. The term "monoclinic phase ratio" is derived from X-ray diffraction pattern of the sintered compact by measuring the integral intensity of (111) face and (11-1) face of the monoclinic phase and of (111) face of the tetragonal phase, and calculating according to the equation below:

$$\text{Monoclinic phase ratio (\%)} = \frac{Im(11-1) + Im(111)}{It(111) + Im(11-1) + Im(111)} \times 100$$

where I indicates the integral strength of the respective face, m indicates the monoclinic phase, and t indicates the tetragonal phase.

The zirconia-alumina composite oxide used for the ferrule of the optical fiber connector part of the present invention should contain yttria as a solid solute in an amount ranging from 2 to 4 mol % in zirconia for stabilization of the zirconia. Use of a stabilizer other than yttria, such as calcia and magnesia, makes larger the zirconia crystal particle diameter in the sintered compact to lower the working precision of the sintered compact surface. Use of ceria as the stabilizer makes lower the shape stability of the spherical face of the ferrule tip. At the yttria content in the zirconia of less than 2 mol % or more than 4 mol %, the sintered compact has a lower flexural strength and lower toughness, and is not suitable for the ferrule of the optical fiber connector. The yttria content is preferably in the range from 2.5 to 3.5 mol %, more preferably from 2.7 to 3.1 mol %.

The zirconia-alumina composite oxide should contain alumina. Without alumina, the shape stability of the spherical phase of the ferrule tip is low, and the optical fiber connector ferrule of the present invention cannot be obtained. The alumina content is preferably in the range from 10% to 50%, more preferably from 15% to 45%, still more preferably from 20% to 40% by weight.

The shape stability of the spherical face of the ferrule tip is improved more and the working precision is improved more with the particle diameter of the crystal particle diameter of zirconia and alumina ranging from 0.05 to 1 μm, the monoclinic phase ratio of 20% or less, the sintered compact density of 98% or higher relative to the theoretical density, and the flexural strength of 100 kgf/mm² or higher, in addition to the above yttria content of the zirconia-alumina composite oxide. Hot isostatic pressure treatment of the composite oxide simultaneously with the sintering improves further the density and strength of the sintered compact to give a optical fiber connector ferrule having excellent spherical face shape stability.

When the above ferrule having a capillary hole for insertion-holding of the optical fiber and the sleeve for connecting and holding the ferrule are both made from zirconia and/or zirconia-alumina composite oxide, the wear between the ferrule and the sleeve at the press connection is decreased, thereby the optical fiber connector part being improved to have durability in repeated connection-disconnection. In particular, the use of the zirconia-alumina composite oxide ensures the confrontation of the axes of the ferrule tips which can be impaired by thermal expansion difference of the materials, producing optical fiber connector parts having high signal transmitting performance in addition to the durability in repeated connection-disconnection.

The zirconia-alumina composite oxide for the optical fiber connector part of the present invention can be produced by molding and sintering a powdery zirconia-alumina mixture obtained by mixing the powdery zirconia containing 2–4 mol % yttria as a solid solute and a predetermined amount of alumina, or a powdery zirconia-alumina mixture disclosed in JP-A-60-215517 by the molding-sintering process described below. The powdery zirconia-alumina mixture can be molded by a known molding method such as pressure molding, injection molding, and extrusion molding. For example, in injection molding, a prescribed amount of an organic binder is added to the above powdery mixture, and blended uniformly by a blender, and the mixture is injection-molded into a desired shape to obtain a molded article having a uniform density; subsequently, the molded article is sintered at a temperature ranging from 1300° C. to 1600° C., and worked to obtain an optical fiber connector part. The above-described sintering is conducted at an atmospheric pressure. By conducting the sintering under pressure, or conducting preliminary sintering at an atmospheric pressure and subsequently conducting sintering under conditions of hot isostatic pressure sintering (HIP), the strength and toughness of the sintered article is further improved to produce an optical fiber connector part having excellent shape stability of the spherical face.

The aforementioned raw material of optical fiber connector is granular preferably. The zirconia-alumina granules of the present invention are a mixture of particles of zirconia and alumina having an average particle diameter of not larger than 1 μm preferably. The particle mixture having an average particle diameter of larger than 1 μm would contain a larger amount of coarse particles containing rigid aggregates to impair the sintering properties and to leave pores in the sintered article. The sintered article having such pores is not suitable for the ceramic material since the mechanical strength thereof is lowered by the pores. Further, such particle mixture blended with an organic binder produces, by molding and sintering, a sintered compact liable to crack owing to poor degreasing properties. The average particle diameter is preferably in the range of 0.4 to 1 μm, more preferably from 0.4 to 0.9 μm. In the absence of the particulate alumina in the granular zirconia-alumina, a higher temperature is required for the molding and sintering of the granules since the granules cannot readily be sintered, and the resulting sintered compact is composed of a larger particle size of crystals and has lower mechanical strength. On the other hand, in the absence of the particulate zirconia in the granular zirconia-alumina, the resulting sintered compact is composed of a larger particle size of crystals and has lower mechanical strength, and is not suitable for the ceramic source powder. For higher mechanical strength of the obtained sintered zirconia-alumina compact, the granules should contain the alumina at a content ranging from 0.1% to 50%, more preferably from 15% to 45%, still more preferably from 20% to 40% by weight.

If the particulate zirconia-alumina mixture is not granular, the flowability of the powder is poor, and zirconia and alumina crystal particles are less uniform to give low mechanical strength. High flowability can be achieved by the zirconia-alumina granules which has nearly spherical shape with few pits on the surface, having the average granular diameter in the range from 30 to 80 μm, and the non-tapped bulk density in the range from 1.10 to 1.40 g/cm³. Such a highly flowable granular zirconia-alumina is readily moldable, and produces molded sintered product having higher uniformity of the zirconia and alumina crystal particles with a higher mechanical strength.

Further, granules having low-temperature sintering characteristics can be obtained, in addition to the aforementioned two conditions of the average particle diameter and the granular state, by use of a mixture of particulate zirconia containing a solid-solute $Y_2O_3$ at a content ranging from 2 to 4 mol % in zirconia, having a BET surface area ranging from 5 to 20 $m^2/g$, and having sintering characteristics to give a sintered compact density of not less than 6.0 $g/cm^3$ by press molding at a molding pressure of 700 $kgf/cm^2$ and sintering at 1500° C.; and particulate alumina having a BET surface area ranging from 5 to 15 $m^2/g$, and having sintering characteristics to give a sintered compact density of not less than 3.5 $g/cm^3$ by press molding at a molding pressure of 700 $kgf/cm^2$ and sintering at 1400° C. Such low-temperature sintering granules produces more uniform zirconia alumina crystal particles, and smaller crystal particle diameter of the molded sintered product having higher mechanical strength.

In production of the granular zirconia-alumina of the present invention, the slurry containing a zirconia alumina particle mixture of an average particle diameter of not more than 1 μm should be dried by spray-drying. The slurry containing a zirconia alumina particle mixture, only when it is spray-dried, will give uniform granular zirconia-alumina having high moldability with high flowability, and will produces a molded sintered compact composed of uniform zirconia and alumina crystal particles and having high mechanical strength. The method of mixing the particulate zirconia and the particulate alumina is not limited. For example, the particulate zirconia and the particulate alumina may be respectively suspended in a separate solvent and subsequently the liquid suspensions are mixed together. Otherwise, the particulate zirconia and the particulate alumina may be mixed and subsequently the mixture is suspended in a solvent. The solvent used in the slurry preparation includes water, and organic solvents such as alcohols. Water as the solution is suitable in industrial mass production since a slurry in water is readily handled in a usual production apparatus. When the average diameter of the particulate zirconia or the particulate alumina is larger than 1 μm, the zirconia or the alumina may be separately ground by wet grinding and then mixed together, or the particulate zirconia and the particulate alumina may be firstly mixed and then ground together by wet grinding. For controlling the granular diameter distribution and the shape of the granules, a thickening agent such as acids, alkalis, and organic substances may be added to the slurry to control the slurry viscosity before the spray drying.

As described above, the zirconia-alumina composite oxide for optical fiber connector parts produces a ferrule which has a tip of dimensionally stable spherical face and has excellent surface workability. The granular zirconia-alumina has excellent sintering characteristics. The granular zirconia-alumina can be produced according to the process of the present invention.

The present invention is described more specifically by reference to examples without limiting the invention in any way.

In the examples below, the ferrule parts were produced by preparing a zirconia-alumina mixture powder under prescribed conditions, blending the mixture by addition of an organic binder in a prescribed amount in a blender, molding the mixture into a molded article of a prescribed shape by injection molding, degreasing the molded article at a temperature of 500° C., and sintering it at 1500° C. for 2 hours (the sintering conditions being different from the above in Examples 3, 9, and 10).

The crystal particle diameter, the monoclinic phase ratio, and the flexural strength of the zirconia-alumina composite oxide were measured by use of test pieces prepared under the same molding and sintering conditions as above. The shape change of the spherical face of the ferrule tip was observed by differential interference polarization microscopy for the samples of the ferrule before press connection, and after 2 weeks of press connection kept at 110° C. under saturated water vapor pressure.

EXAMPLE 1

A ferrule part was prepared from a mixture of powdery zirconia containing yttria at a content of 2.2 mol % and powdery alumina at an alumina content of 30% by weight.

EXAMPLE 2

A ferrule part was prepared in the same manner as in Example 1 except that the powdery zirconia of the yttria content of 2.9 mol % was used.

EXAMPLE 3

The molded article prepared in Example 2 was degreased at 500° C., preheated at 1400° C., treated for HIP at 1500° C. at a pressure of 1500 atm in argon gas for 2 hours to obtain a ferrule part.

EXAMPLE 4

A ferrule part was prepared in the same manner as in Example 1 except that the powdery zirconia of the yttria content of 3.8 mol % was used.

EXAMPLE 5

A ferrule part was prepared from a mixture of powdery zirconia of yttria content of 2.9 mol % and powdery alumina to obtain an alumina content of 10% by weight.

EXAMPLE 6

A ferrule part was prepared in the same manner as in Example 5 except that the alumina content of the mixture was 20% by weight.

EXAMPLE 7

A ferrule part was prepared in the same manner as in Example 5 except that the alumina content of the mixture was 40% by weight.

EXAMPLE 8

A ferrule part was prepared in the same manner as in Example 5 except that the alumina content of the mixture was 50% by weight.

EXAMPLE 9

A ferrule part was prepared in the same manner as in Example 2 except that the sintering was conducted at 1400° C. for 2 hours.

EXAMPLE 10

A ferrule part was prepared in the same manner as in Example 2 except that the sintering was conducted at 1600° C. for 2 hours.

Comparative Example 1

A ferrule part was prepared from only powdery zirconia of an yttria content of 2.9 mol %.

Comparative Example 2

A ferrule part was prepared in the same manner as in Example 1 except that the powdery zirconia of the yttria content of 1.5 mol % was used.

Comparative Example 3

A ferrule part was prepared in the same manner as in Example 1 except that the powdery zirconia of the yttria content of 5 mol % was used.

Comparative Example 4

A ferrule part was prepared from only powdery zirconia containing ceria at a ceria content of 12 mol %.

Comparative Example 5

A ferrule part was prepared in the same manner as in Example 1 except that the powdery zirconia containing ceria at a ceria content of 12 mol % was used.

Comparative Example 6

A ferrule part was prepared in the same manner as in Example 1 except that the powdery zirconia containing calcia at a calcia content of 10 mol % was used.

Comparative Example 7

A ferrule part was prepared in the same manner as in Example 1 except that the powdery zirconia containing magnesia at a magnesia content of 9 mol % was used.

Table 1 shows the chemical composition of the powdery zirconia-alumina mixtures of Examples 1–10 and Comparative Examples 1–7.

Table 2 shows the change of the shape of the spherical face of the ferrules by press connection maintained for 2 weeks at 110° C. under the saturated water vapor pressure.

The process for producing the granular zirconia-alumina is described specifically by reference to Examples.

In Examples, the average particle diameter of the zirconia alumina particle mixture was measured by laser diffraction. The average granular diameter was measured by sieving test. The molding of the granular zirconia-alumina was conducted by press molding with a metal mold at a molding pressure of 700 kgf/cm². The molded article was sintered at 1400° C. for 2 hours.

The particulate zirconia and the particulate alumina employed in Examples and Comparative Examples 8–10 had the sintering characteristics respectively such that the density of the resulting sintered compact was 6.0 g/cm³ or higher (press molded at 700 kgf/cm², and sintered at 1500° C.), and 3.5 g/cm³ or higher (press molded at 700 kgf/cm², and sintered at 1400° C.), and in Comparative Example 11, the density was respectively less than 6.0 g/cm³ and less than 3.5 g/cm³.

EXAMPLE 11

Particulate zirconia containing $Y_2O_3$ at a content of 3 mol % having a BET specific surface area of 14 m²/g, and particulate alumina having a BET specific surface area of 8 m²/g were mixed to obtain a mixture of an alumina content of 0.2% by weight. The mixture was pulverized at a 50% slurry concentration by means of a vibration mill. The resultingzirconia alumina particle mixture had an average particle diameter of 0.7 μm. The viscosity of the slurry was adjusted by addition of a thickening agent. Then the slurry was dried by spray drying.

EXAMPLE 12

A particle mixture was prepared in the same manner as in Example 11 except that the alumina content was changed to 15% by weight. The resulting particle mixture had an average particle diameter of 0.6 μm.

EXAMPLE 13

A particle mixture was prepared in the same manner as in Example 11 except that the alumina content was changed to 20% by weight. The resulting particle mixture had an average particle diameter of 0.6 μm.

EXAMPLE 14

A particle mixture was prepared in the same manner as in Example 11 except that the alumina content was changed to 40% by weight. The resulting particle mixture had an average particle diameter of 0.5 μm.

EXAMPLE 15

A particle mixture was prepared in the same manner as in Example 11 except that the alumina content was changed to 50% by weight. The resulting particle mixture had an average particle diameter of 0.5 μm.

EXAMPLE 16

A particle mixture was prepared in the same manner as in Example 11 except that the particulate zirconia had a BET specific surface area of 5 m²/g. The resulting particle mixture had an average particle diameter of 0.6 μm.

EXAMPLE 17

A particle mixture was prepared in the same manner as in Example 16 except that the alumina content was changed to 20% by weight. The resulting particle mixture had an average particle diameter of 0.6 μm.

EXAMPLE 18

A particle mixture was prepared in the same manner as in Example 16 except that the alumina content was changed to 40% by weight. The resulting particle mixture had an average particle diameter of 0.5 μm.

EXAMPLE 19

A particle mixture was prepared in the same manner as in Example 16 except that the alumina content was changed to 50% by weight. The resulting particle mixture had an average particle diameter of 0.5 μm.

Comparative Example 8

Particulate zirconia containing $Y_2O_3$ at a content of 3 mol % having a BET specific surface area of 14 m²/g was pulverized under the same conditions as in Example 11. The resulting particulate zirconia had an average particle diameter of 0.7 μm. The viscosity of the slurry was adjusted by addition of a thickening agent. Then the slurry was dried by spray drying.

Comparative Example 9

Particulate zirconia containing $Y_2O_3$ at a content of 3 mol % having a BET specific surface area of 5 m²/g was pulverized under the same conditions as in Example 11. The resulting particulate zirconia had an average particle diameter of 0.6 μm. The viscosity of the slurry was adjusted by addition of a thickening agent. Then the slurry was dried by spray drying.

Comparative Example 10

A particle mixture was prepared in the same manner as in Example 13 except that the slurry was dried without addition of the thickening agent by standing, and the dried matter was crushed.

Comparative Example 11

A slurry containing particulate zirconia alumina mixture having an average particle diameter of 2 μm (alumina content in the mixture: 20% by weight, slurry concentration: 50% by weight), after addition of a thickening agent to control the viscosity, was dried by spray drying.

Table 3 shows the properties of the resulting granules obtained in the Examples 11–19 and Comparative Examples 8–11, and the properties of the sintered compacts prepared from the granules.

Obviously from Table 3, the granules of Examples 11–19 and the sintered compacts obtained from the granules had properties superior to the properties of the ones obtained in Comparative Examples 8–11.

TABLE 1

|   | Kind of stabilizer | Stabilizer content (mol %) | Alumina content (weight %) |
|---|---|---|---|
| | Example | | |
| 1 | $Y_2O_3$ | 2.2 | 30 |
| 2 | $Y_2O_3$ | 2.9 | 30 |
| 3 | $Y_2O_3$ | 2.9 | 30 |
| 4 | $Y_2O_3$ | 3.8 | 30 |
| 5 | $Y_2O_3$ | 2.9 | 10 |
| 6 | $Y_2O_3$ | 2.9 | 20 |
| 7 | $Y_2O_3$ | 2.9 | 40 |
| 8 | $Y_2O_3$ | 2.9 | 50 |
| 9 | $Y_2O_3$ | 2.9 | 30 |
| 10 | $Y_2O_3$ | 2.9 | 30 |
| | Comparative Example | | |
| 1 | $Y_2O_3$ | 2.9 | 0 |
| 2 | $Y_2O_3$ | 1.5 | 30 |
| 3 | $Y_2O_3$ | 5 | 30 |
| 4 | $CeO_2$ | 12 | 0 |
| 5 | $CeO_2$ | 12 | 30 |
| 6 | CaO | 10 | 30 |
| 7 | MgO | 9 | 30 |

TABLE 2

|   | Average particle diameter (μm) | Relative density (%) | Monoclinic phase ratio (%) | Flexural strength (kgf/mm²) | Change of spherical face shape |
|---|---|---|---|---|---|
| | Example | | | | |
| 1 | 0.5 | 99.2 | 11 | 111 | None |
| 2 | 0.5 | 99.3 | 3 | 119 | None |
| 3 | 0.5 | 99.8 | 3 | 190 | None |
| 4 | 0.5 | 99.0 | 1 | 120 | None |
| 5 | 0.5 | 99.2 | 3 | 123 | None |
| 6 | 0.5 | 99.2 | 3 | 118 | None |
| 7 | 0.5 | 99.1 | 3 | 106 | None |
| 8 | 0.5 | 98.9 | 3 | 101 | None |
| 9 | 0.3 | 98.8 | 3 | 105 | None |
| 10 | 0.8 | 99.0 | 4 | 103 | None |
| | Comparative Example | | | | |
| 1 | 0.5 | 99.1 | 3 | 109 | Changed |
| 2 | 0.5 | 98.9 | 22 | 87 | Broken |
| 3 | 1 | 98.9 | 0 | 77 | Changed |
| 4 | 0.7 | 99.0 | 0 | 55 | Changed |
| 5 | 0.6 | 99.1 | 0 | 58 | Changed |
| 6 | 1.2 | 97.8 | | 40 | Changed |
| 7 | 1.3 | 97.7 | | 40 | Changed |

TABLE 3

| | Granules | | Non-tapped | Sintered compact | |
|---|---|---|---|---|---|
| | Average granule diameter (μm) | Granule shape | bulk density (g/cm³) | Relative density (%) | Flexural strength (kgf/mm²) |
| | Example | | | | |
| 11 | 59 | Spherical | 1.31 | 99.8 | 120 |
| 12 | 58 | Spherical | 1.25 | 99.8 | 118 |
| 13 | 58 | Spherical | 1.23 | 99.8 | 118 |
| 14 | 59 | Spherical | 1.20 | 99.7 | 120 |
| 15 | 60 | Spherical | 1.20 | 99.7 | 115 |
| 16 | 57 | Spherical | 1.20 | 99.8 | 135 |
| 17 | 60 | Spherical | 1.18 | 99.8 | 130 |
| 18 | 58 | Spherical | 1.17 | 99.8 | 132 |
| 19 | 59 | Spherical | 1.17 | 99.8 | 128 |
| | Comparative Example | | | | |
| 8 | 58 | Spherical | 1.31 | 99.5 | 95 |
| 9 | 56 | Spherical | 1.20 | 85.0 | 71 |
| 10 | 258 | Irregular | 1.05 | 99.5 | 85 |
| 11 | 54 | Spherical | 1.20 | 90.0 | 80 |

What is claimed is:

1. An optical fiber connector part comprising a ferrule having a capillary hole for holding an optical fiber, the ferrule being formed from a zirconia-alumina composite oxide containing yttria at a content ranging from 2 to 4 mol % in zirconia.

2. The optical fiber connector part according to claim 1, wherein a sleeve for connecting and holding the ferrule is formed from zirconia and/or a zirconia-alumina composite oxide.

3. The optical fiber connector part according to claim 2, wherein the sleeve for connecting and holding the ferrule is formed from a zirconia-alumina composite oxide.

4. A process for producing an optical fiber connector part as set forth in any of claims 1 to 3, wherein the granular zirconia-alumina composed of a particulate zirconia-alumina mixture having an average particle diameter of not more than 1 μm is used as raw material.

5. The process for producing an optical fiber connector part according to claim 4, wherein the granular zirconia-alumina contains alumina at a content ranging from 0.1% to 50% by weight.

6. The process for producing an optical fiber connector part according to claim 4, wherein the process comprises spray-drying a slurry containing a particulate zirconia-alumina mixture having an average particle diameter of not more than 1 μm.

* * * * *

UNITED STATES PATENT AND TRADEMARK OFFICE
CERTIFICATE OF CORRECTION

PATENT NO. : 5,926,595

DATED : July 20, 1999

INVENTOR(S): Koji MATSUI, et al.

It is certified that an error appears in the above-identified patent and that said Letters Patent is hereby corrected as shown below:

On the title page, item [75] the 4th inventor's name should be:

--Michiharu OGAI--

Signed and Sealed this

Fifth Day of December, 2000

Attest:

Q. TODD DICKINSON

*Attesting Officer*  *Director of Patents and Trademarks*